United States Patent [19]
Anderson

[11] Patent Number: 4,909,685
[45] Date of Patent: Mar. 20, 1990

[54] INTERLEAVED TAB ASSEMBLY FOR CONNECTING STRUCTURAL MEMBERS

[75] Inventor: Robert E. Anderson, Huntington Station, N.Y.

[73] Assignee: Grumman Aerospace Corporation, Bethpage, N.Y.

[21] Appl. No.: 306,198

[22] Filed: Feb. 6, 1989

[51] Int. Cl.⁴ .............................................. F16B 1/00
[52] U.S. Cl. ..................................... 403/267; 29/513; 244/123; 403/266; 403/274; 403/282
[58] Field of Search ...................... 403/256, 254, 409.1, 403/374, 252, 242, 279, 274, 282, 267, 266; 244/132, 123; 29/513

[56] References Cited
U.S. PATENT DOCUMENTS

| 251,094 | 12/1881 | Carr | 403/256 |
|---|---|---|---|
| 254,842 | 3/1882 | Pflug | 403/282 |
| 3,995,080 | 11/1976 | Cogburn et al. | 244/123 |
| 4,331,495 | 5/1982 | Lackman et al. | 244/132 |
| 4,395,450 | 7/1983 | Whitener | 244/123 |
| 4,786,343 | 11/1988 | Hertzberg | 244/123 |
| 4,811,540 | 3/1989 | Kallies et al. | 244/123 |

Primary Examiner—Andrew V. Kundrat
Assistant Examiner—Carol I. Bordas
Attorney, Agent, or Firm—Pollock, VandeSande & Priddy

[57] ABSTRACT

The invention relates to a joint for aircraft wing skins which have previously been connected to support substructures by rivets or other mechanical fasteners which create stress points and leakage points when aircraft wings are filled with fuel. The invention utilizes interleaved plies of a composite fabric to mechanically interlock the wing skin and support substructure. Use of the invention increases the structural integrity of the connection joint between wing skin and support substructure.

8 Claims, 5 Drawing Sheets

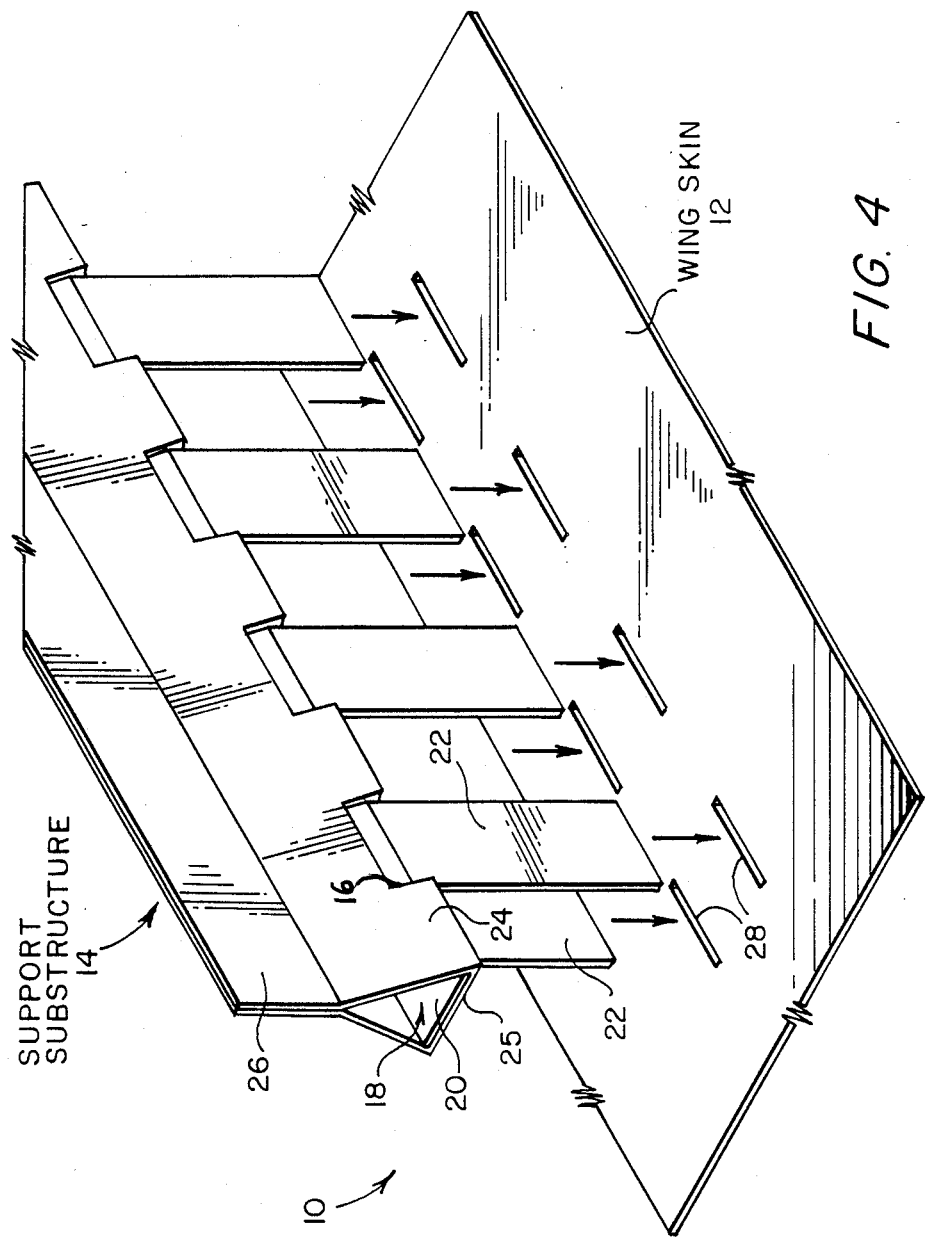

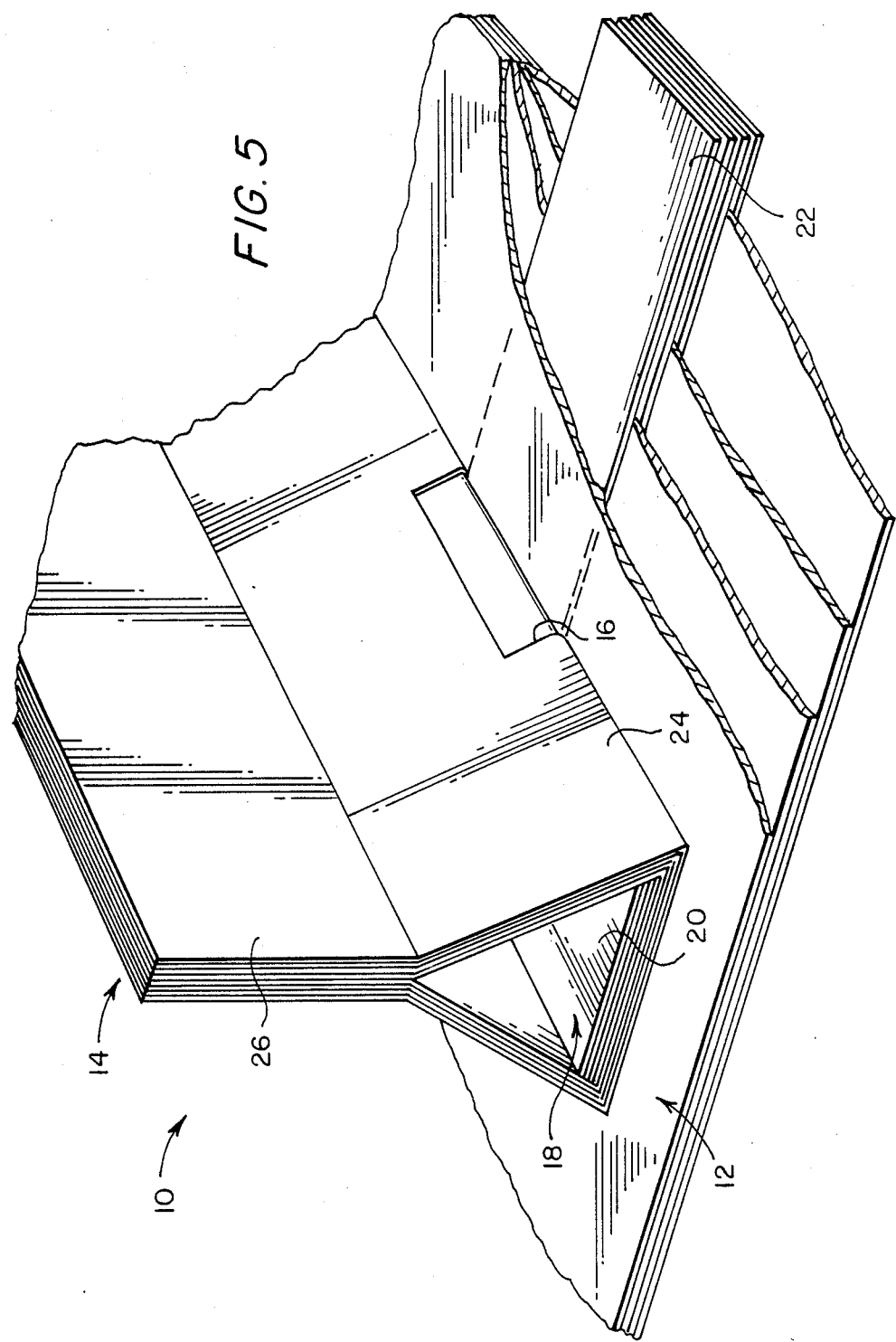

INTERLEAVED TAB ASSEMBLY FOR CONNECTING STRUCTURAL MEMBERS

FIELD OF THE INVENTION

The present invention relates to a fastenerless joint, and more particularly to such a joint for composite aircraft structures.

BACKGROUND OF THE INVENTION

In many fabrication applications laminated structures are attached to support structures by common fastening techniques. In on particular application, composite laminated aircraft wing skins are attached to a support substructure by means of rivets. Within the aircraft environment this creates several problems. In the first place, the rivets passing through the various plies of the laminated structures create stress forces which could cause rupture and ultimate destruction of the aircraft.

In modern fabrication techniques for composite aircraft skins, fuel or other liquids are contained within the skin so that the aircraft structure itself creates a reservoir for the fluid. A serious problem with current construction techniques utilizing fasteners is the presence of leaks where rivets penetrate the composite laminate.

For these and other reasons, it would be highly desirable to create a mechanical joint between aircraft composite laminated skin structures and support subassemblies without the utilization of discrete fasteners.

BRIEF DESCRIPTION OF THE INVENTION

The present invention utilizes mechanically interleaved plies of a composite laminate wing structure which enforces the normal bonding between plies of the laminate.

A ply having flexible tabs is interwoven between a structure subassembly ply and a wing skin ply. The resulting interleaved assembly is typically impregnated with resin and may be co-cured to achieve securement between the wing skin structure and support substructure without the need for discrete metallic fasteners. By avoiding metal fasteners such as rivets, the previously discussed problems of high shear stress and leakage can be eliminated.

Further advantages of the present invention relate to automated precut material use which lends itself to rapid repeatable production and reduction of layup time. The tooling required is relatively uncomplicated, which serves as a distinctive economic advantage of the invention.

BRIEF DESCRIPTION OF THE FIGURES

The above-mentioned objects and advantages of the present invention will be more clearly understood when considered in connection with the accompanying drawings, in which:

FIG. 4 is a disassembled view of the support structure ply and the wing skin structure ply by means of the interleaved tabs.

FIG. 5 is a cut-away view of the present invention wherein multiple plies for each structural means are employed, instead of the single plies, as illustrated in the previous figures.

DETAILED DESCRIPTION OF THE INVENTION

Figure 1:
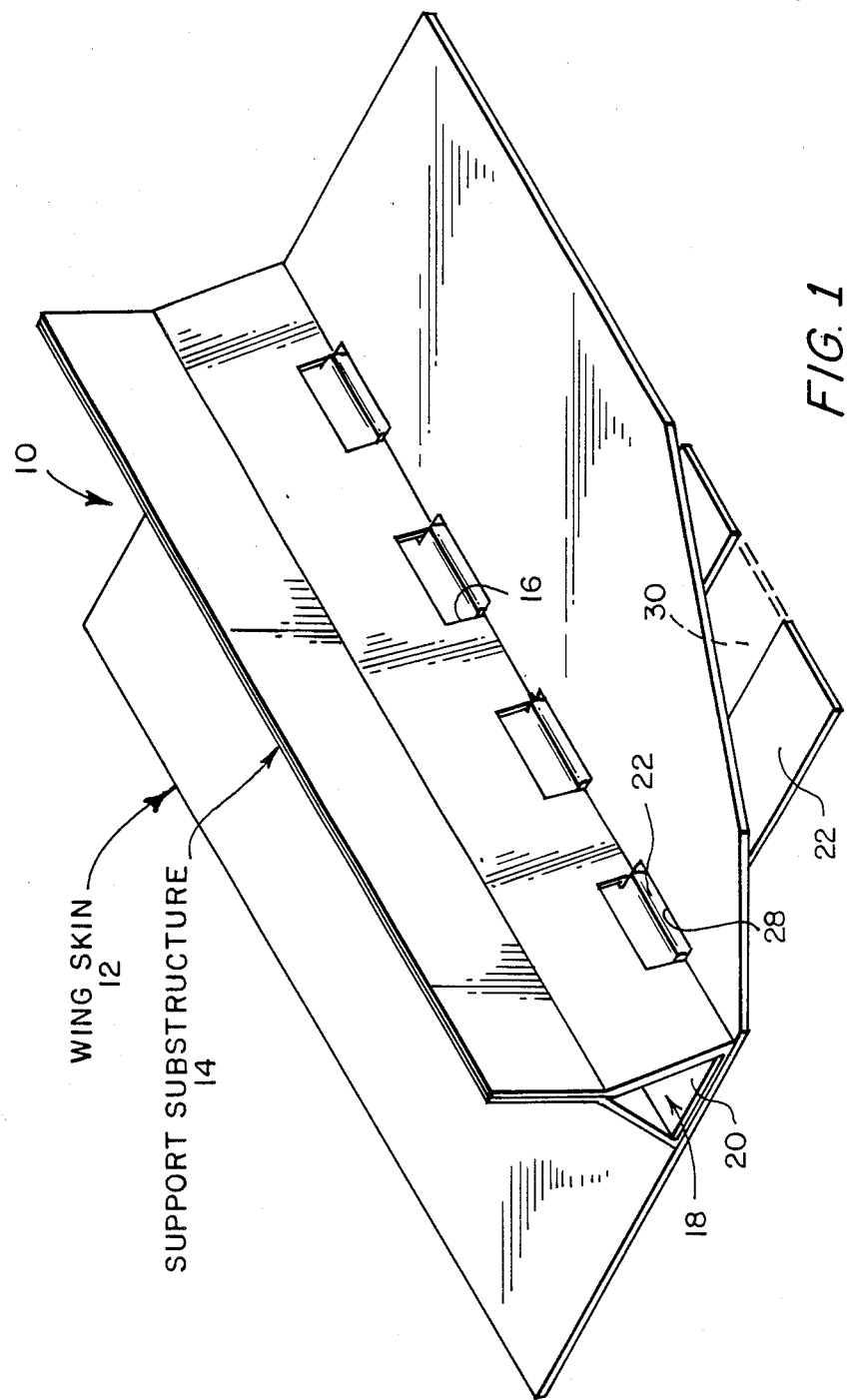
FIG. 1 is a perspective view illustrating interlocking engagement between a wing skin structure and support substructure in accordance with the present invention.

FIG. 1 illustrates an elementary form of the present invention and is seen to include two interleaved structural members generally indicated by reference numeral 10. The following discussion of the invention will be directed to one example of the invention, namely, the utilization of interleaving fastening between two structures of an aircraft. Thus, an elementary single ply substructure 14 is illustrated for supporting a single ply aircraft wing skin 12. Both wing skin 12 and support substructure 14 are contemplated as being fabricated from resin-impregnated composite fabrics, as is well known in the aircraft industry.

The support substructure 14 has a generally triangular cross section wherein rectangular recesses 16 are formed within the illustrated base portion. In order to geometrically lock the substructure and wing skin together, a connective interleaving ply, generally indicated by reference numeral 18, is employed. The interleave ply has a medial section 20 which is received longitudinally along the interior of base of the support substructure 14. At regularly spaced intervals tabs 22 extend outwardly from the medial section 20 and pass through slits 28 where they extend laterally outwardly in juxtaposition with the underside of the wing skin 12. With all the explained parts being fabricated from resin-impregnated composite fabrics, they may be easily cured to geometrically bond and lock the wing skin 12 to the support substructure 14.

Figure 2:
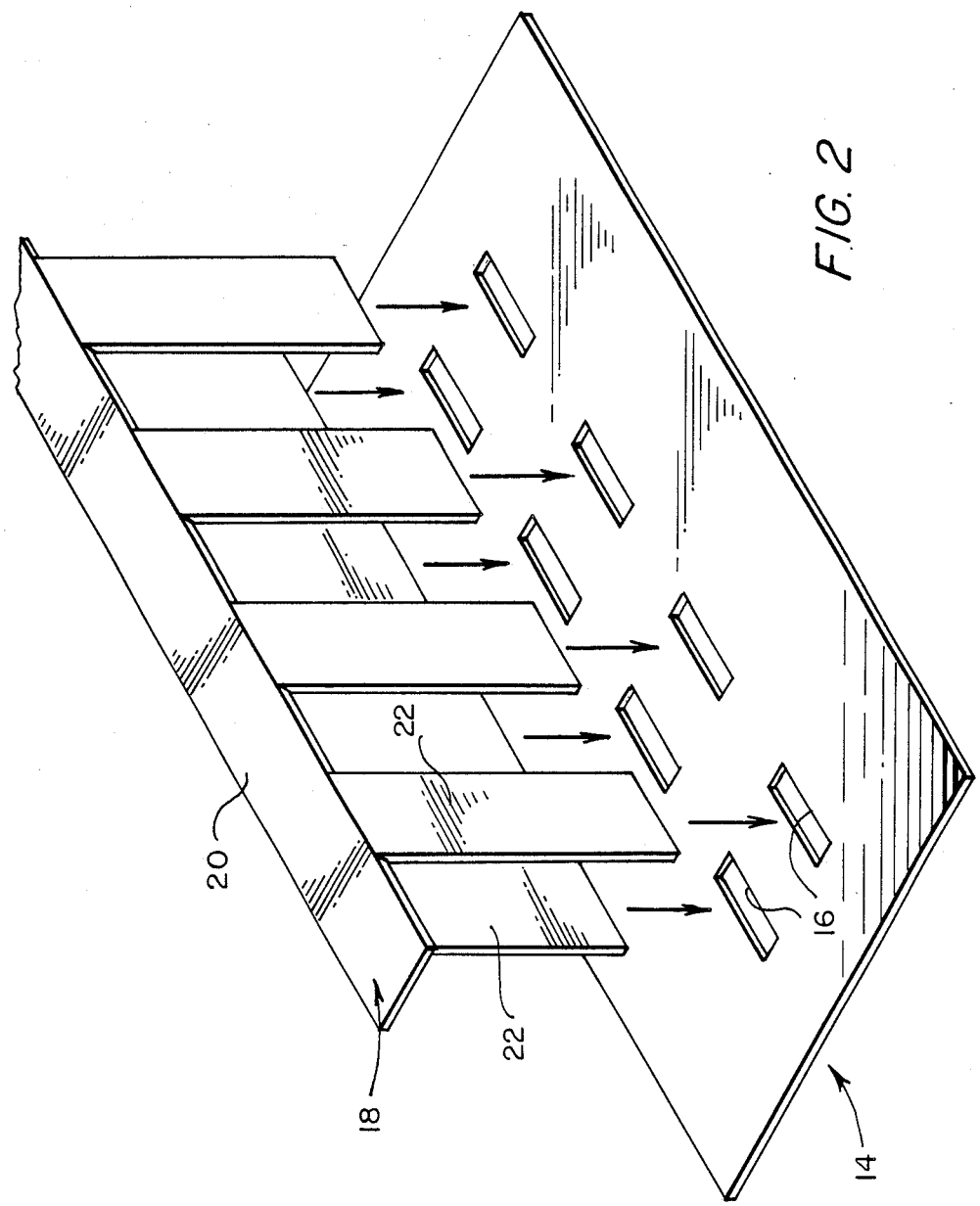
FIG. 2 is a perspective view illustrating the initial step in interleaving tab portions of an interleaving ply though openings formed in a support substructure ply.
Figure 3:
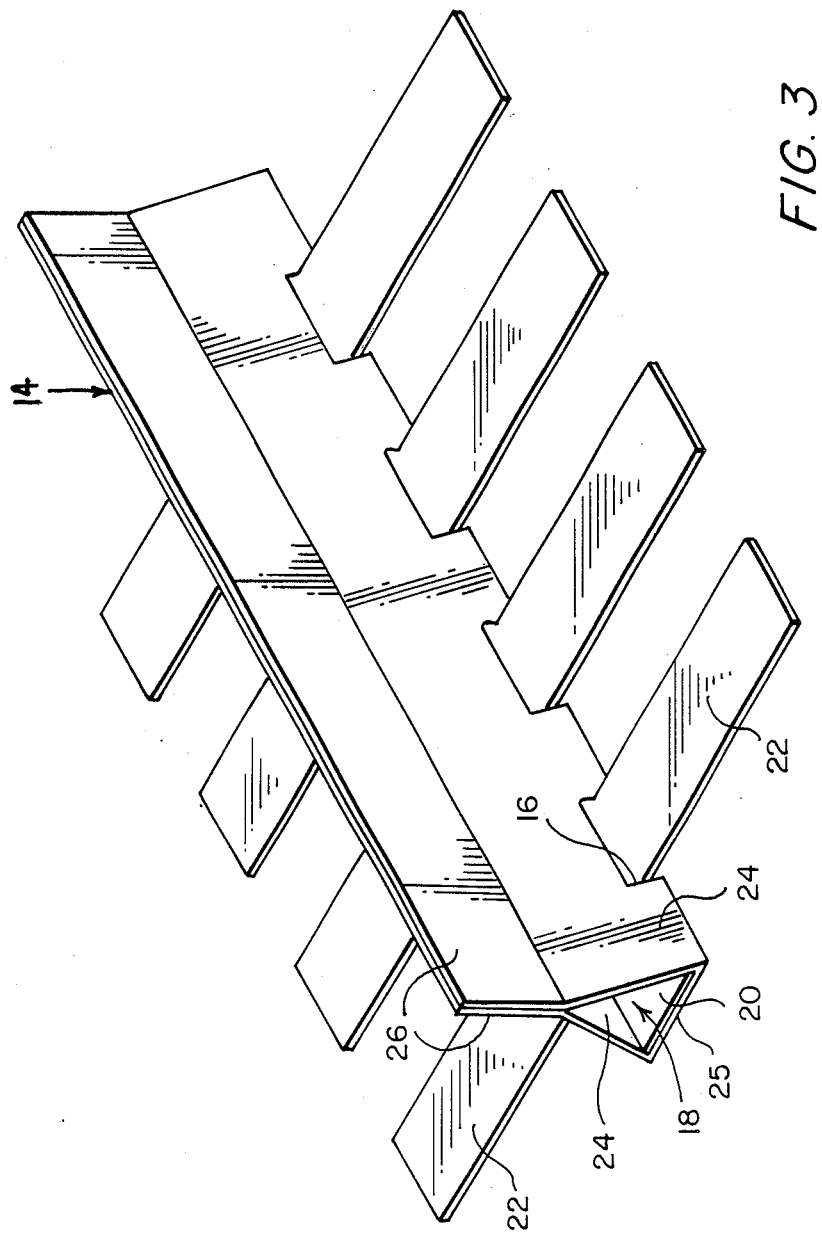
FIG. 3 is a perspective view illustrating completion of the support substructure shape with the tabs of the interleaving ply extending therefrom.

In order to better appreciate the construction of the invention, FIG. 2 illustrates an initial construction step for fabricating the support substructure 14. It is to be emphasized that the support substructure 14 is shown in an initial planar or unfolded state. As will be explained it is later folded to form a generally triangular cross section. The interleave ply 18 is shown to be positioned above the support substructure 14 with the tabs 22 being folded downwardly from the medial section 20. The tabs 22 are pushed through corresponding rectangular recesses 16; and the tabs are then folded laterally outwardly, as shown in FIG. 3. The planar ply of support substructure 14 is then folded to achieve the generally triangular cross section, as shown in FIG. 3. The finished support substructure 14, indicated in FIG. 3, illustrates the inclined sides 24, the base 25 and apex extensions 26 which are folded together and bonded when he substructure is cured.

FIG. 4 illustrates the assembly of a wing skin structure 12 to the support substructure 14. The fastening of the wing skin 12 to the substructure 14 is accomplished by using two means. The first is the bonding of the resin-impregnated wing skin 12 and substructure 14 along their interface. This type of bonding is conventional in aircraft fabrication. However, the present invention, in addition to the bonding, geometrically locks or fastens the wing skin 12 to the support substructure 14 by virtue of the tabs 22 which become geometrically locked between the wing skin and substructure.

More particularly, the tabs 22 are pushed through slits 28 formed in the wing skin 12 in locations corresponding to the downwardly directed tabs. The tabs, as mentioned before, form part of the interleaved ply 18. As shown in FIG. 4, the medial section 20 of interleaved ply 18 is secured within the internal triangular opening of the substructure. By pushing the tabs 22 fully through slits 28 and bending the tabs 22 outwardly against the underside of wing skin 12, a geometrical mechanical lock between the substructure 14 and wing skin 12 occurs. This geometrical lock is secured when the resin-impregnated tabs 22 and resin-impregnated skin 12 are co-cured thereby resulting in a finished assembly shown in FIG. 1.

Now that the construction of the present invention has been explained, it is important to point out that the support substructure 14 will normally be located in the interior of the wing while the wing skin 12 serves as the exterior of the wing. A particular advantage of the present invention is that the method set forth herein lends itself to fabricating an aircraft wing from the inside (substructure 14) to tee outside (wing skin 12).

It should also be pointed out that, although the present invention has thus far been described in terms of single plies for each of the main structural elements: wing skin 12, support substructure 14, and interleaved ply 18, it is anticipated that multiple plies for these structure units will be employed. This is illustrated in FIG. 5 wherein multiple plies of each structural unit are employed. Consequently, the tabs 22 of each added interleaved ply 18 will be pushed into juxtaposition with the underside of each added wing skin ply 12. As a result, each of the wing skin plies will become geometrically locked to corresponding overlying and underlying plies of support substructure 14.

Referring once again to FIG. 1, it will be appreciated that, when multiple plies are employed for the wing skin 12, a difference in the total thickness of the wing skin will result at points where tabs 22 exist as compared with those areas between the tabs which will be thinner. When the thickness deviation reaches a disadvantageous level, it may be desirable to redesign the wing skin structure so that spacer strips 30 are positioned between tabs 22 of each ply so that a uniform thickness will exist throughout the wing skin 12.

Although the tabs 22 have been illustrated as being of the same length, this is purely to simplify the previous explanation of the invention. In reality it is desirable that the length of each ply be staggered somewhat from an overlying and underlying tab so that a smooth dimensional transition occurs where overlying and underlying wing skin plies are sandwiched against an intermediately positioned tab. Otherwise stated, if all of the tabs were, in actuality, the same size, a "bulge" or step change in thickness will occur at the point where all the overlying outer edges of the tabs are sandwiched between the wing skin plies. Such a condition would encourage delamination as the fabricated wing skin encountered shear stress. In fact, it is important to emphasize that, by sandwiching only pairs of tabs between overlying and underlying wing skin plies, reinforced bonding between the wing skin and support substructure occurs along parallel planes which further decreases the possibility of delamination.

According to the previous description of the invention, by pushing the tabs 22 through corresponding rectangular slots 16 and bending the tabs against a corresponding wing skin ply, a geometrical mechanical lock between the substructure 14 and wing skin 12 occurs. This geometrical lock is secured when the resin-impregnated tabs 22 and resin-impregnated plies of skin 12 are co-cured thereby resulting in strong finished assembly.

Now that the construction of the present invention has been explained, it is important to point out that the support substructure 14 will normally be located in the interior of a completed wing assembly, while the wing skin 12 serves as the exterior of the wing.

It should be further noted that the large rectangular interface area between the base of the support substructure 14 and wing skin 12 resists buckling if compared to joints where rivets or the like are used.

It should be understood that the invention is not limited to the exact details of construction shown and described herein for obvious modifications will occur to persons skilled in the art.

I claim:

1. A joint for interlocking first and second interleaved structural members, the joint comprising:
   a first hollowed structural member fabricated from at least a first ply having a plurality of parallel rows of openings formed in an elongated base thereof;
   an interleaving connective member fabricated from at least a second ply having a medial section and tabs extending therefrom for insertion through corresponding openings in the first ply;
   a second structural member comprising at least one ply having openings therein correspondingly aligned with the openings in the first member and receiving respective tabs;
   wherein the tabs interleave between the first and second structural members and are bonded to the second structural member for forming a joint therebetween.

2. The structure set forth in claim 1, wherein the second structural member is fabricated from a plurality of plies.

3. The structure set forth in claim 2, wherein the connective member is fabricated from a plurality of plies creating a corresponding number of overlying tabs received through respective openings in the second structural member.

4. The structure set forth in claim 3, wherein the overlying tabs are sequentially positioned in bonded sandwiched contact with alternate overlying and underlying plies of the first structural member.

5. In an aircraft including a multiple ply skin structure and a hollowed multiple ply support substructure, a joint for securing the two together and comprising:
   a plurality of parallel rows of openings formed in a base portion of the substructure;
   a plurality of parallel rows of openings formed in the skin structure and correspondingly aligned with the openings in the substructure;
   a multiple ply connective member having a medial portion received within the substructure, the connective member further having overlying tabs extending laterally for passage through corresponding openings in the support substructure and skin structure and sequentially positioned in bonded sandwich contact with alternate overlying and underlying plies of the skin structure.

6. The structure set forth in claim 5 together with spacer strips positioned between longitudinally adjacent tabs for attaining a uniform skin structure thickness.

7. The method for securing a skin structure to a support substructure comprising the steps:
   forming parallel rows of openings in the base portion of a multiple ply support substructure;
   forming a plurality of parallel rows of openings in multiple plies of the skin structure, the latter openings correspondingly aligned with the openings in the support substructure;
   forming a multiple ply connective member, each ply having a medial portion extending laterally outwardly to tabs which overly correspondingly positioned tabs of other plies;
   positioning overlying medial portions in the support substructure;
   passing the tabs through correspondingly positioned openings in the support substructure and skin structure; and
   sequentially positioning each overlying tab in sandwiched contact with respective individual overlying and underlying plies of the skin structure.

8. The method of claim 7, together with the step of bonding the tabs to the plies of the skin structure thereby securing a joint between the support substructure and the skin structure.

* * * * *

UNITED STATES PATENT AND TRADEMARK OFFICE
CERTIFICATE OF CORRECTION

PATENT NO. : 4,909,655
DATED : March 20, 1990
INVENTOR(S) : Robert E. Anderson

It is certified that error appears in the above-identified patent and that said Letters Patent is hereby corrected as shown below:

Title page:

In the Abstract, line 3, after "by" insert --means of--.

Column 1, line 14, change "on" to --one--.

Column 1, line 65, change "though" to --through--.

Column 2, line 56, change "he" to --the--.

Column 3, line 22, change "tee" to --the--.

Column 4, line 4, after "in" insert --a--.

Signed and Sealed this

Nineteenth Day of March, 1991

Attest:

HARRY F. MANBECK, JR.

*Attesting Officer*        *Commissioner of Patents and Trademarks*